United States Patent [19]

Palm et al.

[11] Patent Number: 4,835,668
[45] Date of Patent: May 30, 1989

[54] POWER SUPPLY WITH TWO OUTPUT VOLTAGES

[75] Inventors: Erich J. Palm; Johannes B. Meertens, both of Eindhoven, Netherlands

[73] Assignee: U. S. Philips Corporation, New York, N.Y.

[21] Appl. No.: 161,522

[22] Filed: Feb. 29, 1988

[30] Foreign Application Priority Data

Mar. 23, 1987 [NL] Netherlands ......................... 8700668

[51] Int. Cl.[4] .......................................... H02M 3/335
[52] U.S. Cl. ..................................... 363/21; 323/268; 323/270; 323/902; 358/190; 315/411
[58] Field of Search ....................... 363/20, 21, 68, 89, 363/98; 323/268, 270, 273, 274, 902, 229; 358/190; 315/411

[56] References Cited

U.S. PATENT DOCUMENTS

| | | | |
|---|---|---|---|
| 3,192,467 | 6/1965 | Baracket | 323/270 |
| 3,237,078 | 2/1966 | Mallory | 323/268 |
| 3,321,631 | 5/1967 | Biard et al. | 323/902 |
| 3,458,801 | 7/1969 | Polson | 323/270 |
| 4,531,181 | 7/1985 | Herz et al. | 363/21 |

Primary Examiner—Peter S. Wong
Attorney, Agent, or Firm—Edward W. Goodman

[57] ABSTRACT

A power supply circuit for generating two direct voltages. A preload, having a tap for deriving the second voltage, is arranged between the lead conveying the first voltage and a reference potential. To prevent mutual influences between the two voltages, the preload is in the form of a series arrangement of at least one resistor and a plurality of reverse-biassed semiconductor diodes, an abrupt change of the differential resistance occurring above a given value of the current through these diodes. A controllable semiconductor element for controlling the second voltage is incorporated between the tap and the lead conveying the second voltage. The first voltage may be an E.H.T. for a final anode of a picture display tube, the second voltage is then a focussing voltage for a focussing electrode of this tube.

10 Claims, 1 Drawing Sheet

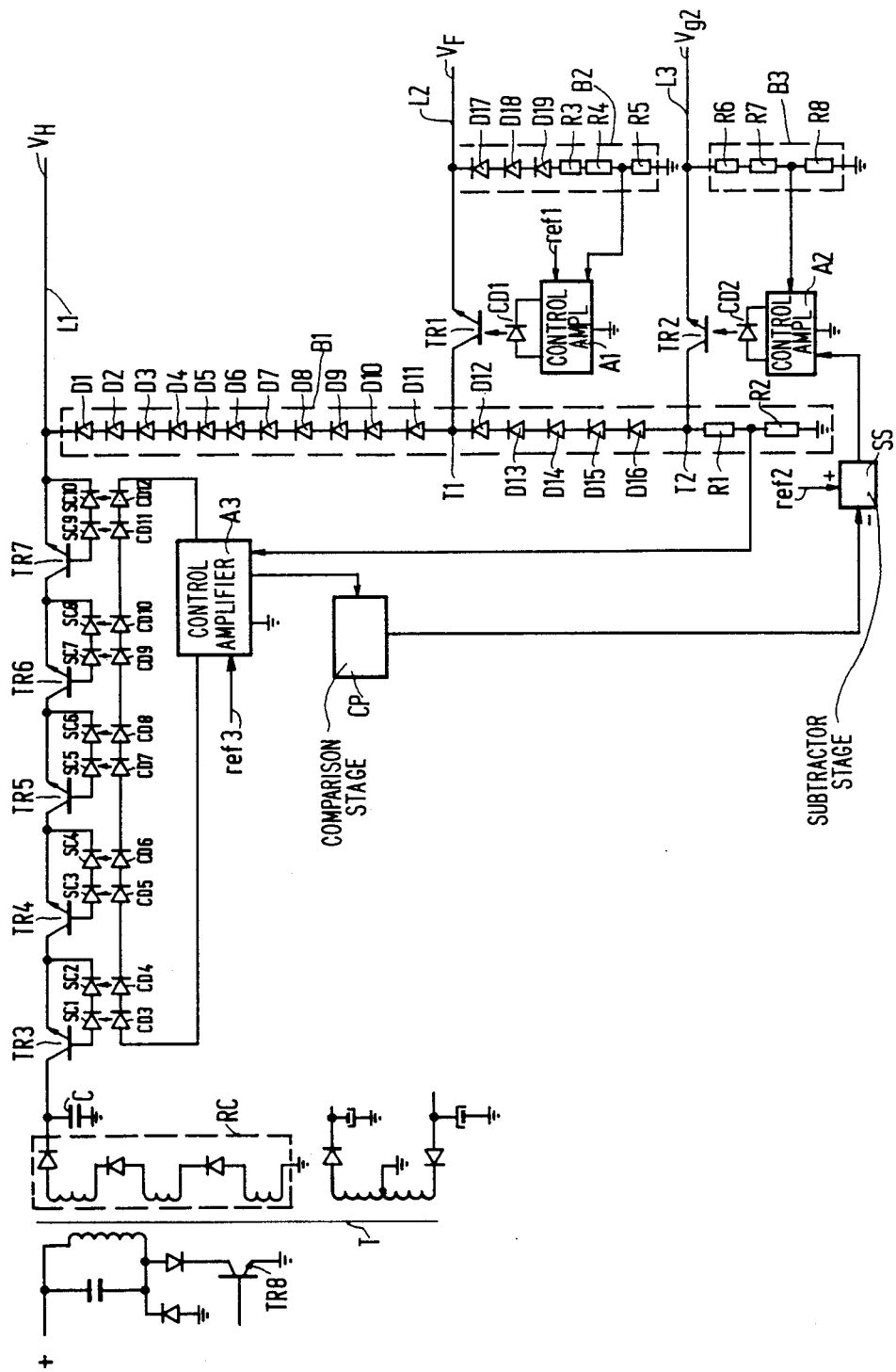

POWER SUPPLY WITH TWO OUTPUT VOLTAGES

BACKGROUND OF THE INVENTION

The invention relates to a power supply circuit for generating a first direct voltage on a first lead and a second direct voltage on a second lead, said second voltage being lower than the first voltage, a preload arranged between the first lead and a reference potential having a tap which is coupled to the second lead.

A circuit of this type is known from German Patent Specification No. 3,318,503. In this known circuit, the preload comprises the series arrangement of a plurality of ohmic resistors having a high value. The first voltage is an extra high tension (E.H.T.) for a final anode of a picture display tube. A current which is a loss always flows through the preload, which is why it is generally termed "bleeder" in the English language. This current ensures that the E.H.T. generator always has a load so that the E.H.T. cannot increase too high in the absence of beam current, which could cause X-ray radiation and that the internal impedance of the E.H.T. source is somewhat reduced.

For the focussing electrode of the picture display tube, the second voltage is derived from a suitable tap on the bleeder. In this way, a separate generation of the second voltage, for example with a separate transformer is not necessary. A drawback is, however, that the two voltages may influence each other in the case of variations of their loads, in this case the focussing current and the beam current. In fact, the use of an ohmic load resistor having a practical real value leads to an inadmissibly high internal impedance of the voltage source which is derived therefrom.

SUMMARY OF THE INVENTION

It is an object of the invention to provide a power supply circuit of the type described above which does not have this drawback, thus in which a voltage source having a low internal impedance can be derived from the bleeder and to this end, the generator according to the invention is characterized in that the preload is in the form of a series arrangement of at least one resistor and a plurality of reverse-biassed semiconductor diodes, an abrupt change of the differential resistance occurring above a given value of the current through said diodes, and a controllable semiconductor element for controlling the second direct voltage being incorporated between the tap and the second lead.

In diodes which do not exhibit the abrupt change a balanced current state could at least theoretically occur without a series resistor, but in diodes which do have this property the current through the diodes is better determined and is also limited by means of the resistor, while the voltage thereacross is rather independent of the current.

A second preload comprising at least a second resistor is preferably arranged between the second lead and the reference potential, the voltage present in operation across the second resistor being coupled to a control amplifier for controlling the current through the semiconductor element for determining the second direct voltage. The preload thereby acquires a second function, namely, the generation of control information for a stabilizing circuit.

The load of the second voltage has a still smaller influence on the first voltage if a second controllable semiconductor element, for controlling the first direct voltage, is incorporated in series with the first lead, the voltage present in operation across the first mentioned resistor being coupled to a second control amplifier for controlling the current through the second semiconductor element.

A power supply circuit, in which the first voltage is an extra high tension for a final anode of a picture display tube and in which the second voltage is a focussing voltage for a focussing electrode of the said tube, may be characterized in that the reference voltage for determining the focussing voltage comprises a modulating component for modulating the focussing voltage. The second voltage may also be the acceleration voltage for an accelerating electrode of the said tube. The voltage on the different electrodes of the picture display tube are substantially independent of each other and may have any desired variation, whilst the sources of these voltages have very low internal impedances.

BRIEF DESCRIPTION OF THE DRAWING

The invention will now be described in greater detail, by way of example, with reference to the accompanying drawing in which the sole FIGURE shows a high voltage generator for generating different supply voltages for electrodes of a picture display tube.

DESCRIPTION OF THE PREFERRED EMBODIMENT

In the extra high tension (E.H.T.) generator shown in the FIGURE, an E.H.T. $V_H$, having a nominal value of, for example, 23 kV, is present on a lead L1. Lead L1 is connected to a final anode of a picture display tube (not shown). A bleeder B1, comprising the series arrangement of 16 diodes D1, D2, ..., D15 and D16 and 2 ohmic resistors R1 and R2, is arranged between lead L1 and a reference potential, for example, ground. Diodes D1 to D16 are controlled avalanche diodes, for example, the Philips type BYD13M, which are reverse-biassed, that is to say the anodes are coupled to ground and the cathodes are coupled to lead L1. The voltage drop across a diode, the avalanche voltage, has a value which is between 1.1 and 1.6 kV and which is rather independent of the current flowing through the diode. The value of this current can be determined by the choice of resistors R1 and R2, in this example 13 MΩ and 68 kΩ, respectively.

The junction point of the anode of the diode D11 and the cathode of diode D12 constitutes a tap T1 on the bleeder B1 for deriving a voltage for the focussing electrode of the display tube. An npn-control transistor TR1, for example the crystal of the Philips type BU508, is incorporated between tap T1 and a lead L2 connected to this electrode, the collector being connected to the tap T1 and the emitter being connected to the lead L2. A second bleeder B2, comprising the series arrangement of 3 controlled avalanche diodes D17, D18 and D19, which are likewise of the type BYD13M, and 3 ohmic resistors R3, R4 and R5, having values of 30 M106, 20 MΩ and 68 kΩ, respectively, is connected between lead L2 and ground.

Similarly, the junction point of the anode of diode D16 and resistor R1 constitutes a second tap T2 on the bleeder B1 for deriving a voltage for a first accelerating electrode of the display tube which is also referred to as the second grid. An npn control transistor TR2, which is of the same type and is similarly connected as transistor TR1, is incorporated between tap T2 and a lead L3 connected to this electrode. A third bleeder B3, comprising the series arrangement of 3 ohmic resistors R6, R7 and R8 having values of 20 MΩ, 6.8 MΩ and 330 kΩ, respectively, is arranged between lead L3 and ground.

Under these described circumstances, the focussing voltage $V_F$ on lead L2 can be adjusted between the desired values of 6.6 and 7.6 kV in dependence upon the current flowing through the collector-emitter path of transistor TR1. Similarly, the acceleration voltage $V_{g2}$ on lead L3 can be adjusted between the desired values of 575 and 825 V. Nominally, the voltage $V_F$ has a value of 7.1 kV and voltage $V_{g2}$ has a value of 700 V. Currents having the values of 100, 50 and 26 μA flow through the adjusting resistors R1, R3 and R6, respectively. A current of 176 μA flows through diodes D1 to D11 with a voltage drop of 1.4 kV, at an average, for each diode and a current of 126 μA flows through diodes D12 to D16 with a voltage drop of 1.25 kV, at an average, for each diode. For the dimensioning given, the grid currents of the focussing electrode and the second grid as well as the dynamic impedance of the semiconductor diodes have been taken into account.

Voltages, each being a measure of the value of the voltage on the relevant lead, that is to say, voltage $V_F$, or $V_{g2}$, or $V_H$, are present across resistors R5, R8 and R2. These measuring voltages are applied to three control amplifiers A1, A2 and A3 each also receiving reference voltages ref1, ref2 and ref3, respectively. The applied measuring and reference voltages are compared by means of each control amplifier and the difference therebetween is amplified so that at the output of the amplifier, a control current flows through a control element connected thereto. This control element is one light-emitting diode CD1 and CD2 at the output of both amplifier A1 and amplifier A2, respectively, and, at the output of amplifier A3, the control element is in the form of the series arrangement of 10 light-emitting diodes CD3, CD4 . . . , CD12 arranged in 5 groups of 2. All diodes CD1 to CD12 are of the Philips type CQY89A. They generate an infrared light. The light from diode CD1 is passed to the base-emitter junction of transistor TR1 and influences the current through this transistor, and similarly, diode CD2 influences the current through transistor TR2. The current-light transfer of the control diodes is substantially linear. The described control circuits with amplifiers A1 and A2 maintain voltages $V_F$ and $V_{g2}$ substantially constant if voltages ref1 and ref2 are constant.

For the control of voltage $V_H$, 5 npn transistors TR3, TR4, TR5, TR6 and TR7, which are of the Philips type BU508, are arranged in series with lead L1 and have the same direction of conductivity, namely with their emitters facing the final anode of the picture display tube. Since the variation caused by a light-emitting diode is too small for controlling voltage $V_H$, the series arrangement of two solar cells of the Philips type BPW42 is provided between the base and the emitter of each transistor. The light from diodes CD3 and CD4 is passed to the solar cells SC1 and SC2 at the input of transistor TR3 and influences the current through this transistor. Similarly, the other solar cells SC3 to SC10 are exposed for controlling the current to the bleeder B1. The possible variation of voltages $V_F$ and $V_{g2}$ is small, more specifically because of the implementation of the bleeder in the form of avalanche diodes so that one control transistor is sufficient, but the ripple on the E.H.T. $V_H$ may have such a high amplitude that a plurality of control transistors is required. In the described embodiment, a maximum adjusting range of 1 kV was handled for voltages $V_F$ and $V_{g2}$ and of 4 kV for voltage $V_H$ with low values for the internal impedance Ri of the respective voltage sources. For voltage $V_H$ the Ri was smaller than 5 kΩ at a peak current of 10 mA, for voltage $V_F$ the Ri was smaller than 1 MΩ at a peak current of + or −20 μA and for voltage $V_{g2}$ the Ri was smaller than 100 kΩ at a peak current of + or −20 μA.

Any known type of generator can be used for generating the voltage at the collector of transistor TR3, from which voltage the three voltages $V_H$, $V_F$ and $V_{g2}$ are derived. The FIGURE shows a generator with a transformer T, and an npn transistor TR8 of the Philips type BUT11AF operating as a switch on the primary side which is switched at a high frequency, for example at the line frequency, and a retrace rectifier RC on the secondary side which is formed with a plurality of diodes forming one assembly with partial windings (a so-called diode split transformer). For a non-interrupted operation of the stabilizing circuit, a capacitor C of, for example, 2.7 nF is arranged parallel to the secondary winding. Auxiliary supply voltages are generated by means of further secondary windings of transformer T.

The control amplifiers A1, A2 and A3 are formed in known manner, each with a comparison stage for comparing the voltage across the respective measuring resistor R5, R8 or R2 with the respective reference voltage ref1, ref2 or ref3, an amplifier for amplifying the difference voltage found, and a voltage-current converter for generating the control current through the respective control diodes CD1, CD2 or CD3 to CD12. Voltages ref1 and ref2 are preferably adjustable for adjusting the focussing voltage and the acceleration voltage, respectively, to the correct value. For obtaining a dynamic adjustment of the focussing voltage, a modulating voltage with the line and/or the field frequency and with the desired variation as a function of time can be added to voltage ref1 in a simple manner. Amplifier A3 has a facility for supplying information about the value of the beam current, i.e. the current flowing through lead L1. Such a facility may be, for example, a resistor through which a current flows which is dependent on the control current generated by amplifier A3. The voltage across this resistor is compared in a comparison stage CP with a pre-adjusted value. If this voltage exceeds this threshold value as a result of an excessive beam current, a safety facility is activated, for example because a voltage is subtracted from voltage ref2 by means of a subtractor stage SS so that voltage $V_{g2}$ is decreased considerably.

Bleeders comprising avalanche diodes in series with ohmic resistors have been described hereinbefore. Since the voltage across one of these resistors is used as a measuring voltage for a control circuit, a connection of this resistor is preferably grounded. It will be evident that this is not necessary, for example if no control is used for the E.H.T., so that one or more ohmic resistors in the bleeder may have any arbitrary location, for example one between the relevant electric lead and the first avalanche diode and one between the last avalanche diode and ground. The number of diodes is determined by the voltage drop thereacross and by the voltages to be obtained. It will also be evident that the control circuit(s) can be formed in a manner which is different from that mentioned hereinbefore, although the described series control(s) is (are) preferred due to the greater bandwidth with respect to sampled controls.

In the control circuit described, use has been made of control transistors. It will be noted that other known controllable semiconductor elements, such as diodes, may be used in the same position. It will also be noted that the control transistor TR3 to TR7 for controlling the high voltage can be arranged between the low end of the high voltage winding of transformer T and ground, which decreases the voltage requirements for the transistors. However, the insulation requirements for the transformer will be more stringent, so that the arrangement shown in the FIGURE is preferred.

The embodiment described relates to a power supply circuit for different electrodes of a cathode ray tube. A very low internal impedance is obtained for the E.H.T. source. The circuit is thus suitable for uses, for example with penetron tubes, in which it must be possible to switch an E.H.T. rapidly. It will be evident that the circuit can generate a number of voltages which is different from three voltages, in other words the bleeder B1 may have an arbitrary number of taps. It will also be evident that the use of such a circuit need not be limited to the generation of high voltages, that is to say, of the order of kilovolts. If the voltages which are generated are low, the controlled avalanche diodes may be replaced by zener diodes. Both are semiconductor diodes which are reverse-biased, with an abrupt change of the differential resistance occurring above a given value of the current through the diodes, while the value of the voltage drop across each diode is rather independent of the current. It may be noted that the use of zener diodes for the bleeder is not practical when generating high voltages in view of the low values of zener voltages that can be realized in these elements.

What is claimed is:

1. A power supply circuit for generating a first direct voltage on a first lead and a second direct voltage on a second lead, said second direct voltage being lower than the first direct voltage, a preload arranged between the first lead and a reference potential having a tap which is coupled to the second lead, characterized in that the preload is in the form of a series arrangement of at least one resistor and a plurality of reverse-biassed semiconductor diodes, an abrupt change of a differential resistance of said diodes occurring above a given value of current through said diodes, and a controllable semiconductor element for controlling the second direct voltage being incorporated between the tap and the second lead.

2. A power supply circuit as claimed in claim 1, characterized in that a second preload, comprising at least a second resistor, is arranged between the second lead and the reference potential, the voltage present in operation across the second resistor being coupled to a control amplifier for controlling the current through semiconductor element for determining the second direct voltage.

3. A power supply circuit as claimed in claim 2, characterized in that a second controllable semiconductor element for controlling the first direct voltage is incorporated in series with the first lead, the voltage present in operation across said at least one resistor being coupled to a second control amplifier for controlling the current through the second semiconductor element.

4. A power supply circuit as claimed in claims 3, characterized in that the control amplifier comprises a comparison stage for comparing the voltage present across the resistor with a reference voltage.

5. A power supply circuit as claimed in claim 4 characterized in that the coupling between the control amplifier and the semiconductor element comprises a light-coupling element.

6. A power supply circuit as claimed in claim 1, characterized in that the diodes are controlled avalanche diodes.

7. A power supply circuit as claimed in claim 4 in which the first voltage is an extra high tension for a final anode of a picture display tube and in which the second voltage is a focussing voltage for a focussing electrode of said tube, characterized in that a reference voltage for determining the focussing voltage comprises a modulating component for modulating the focussing voltage.

8. A power supply circuit as claimed in claim 7, in which the first lead is coupled to a rectifier for rectifying pulses present across a winding, characterized in that the second controllable semiconductor element is incorporated between the rectifier and the first lead.

9. A power supply circuit as claimed in claim 4 in which the first voltage is an extra high tension for a final anode of a picture display tube, characterized in that the second voltage is an acceleration voltage for an accelerating electrode of said tube.

10. A power supply circuit as claimed in claim 9, characterized in that a reference voltage for determining the voltage on the accelerating electrode comprises a component which is dependent on the load of the final anode for decreasing the voltage when the load exceeds a predetermined value.

* * * * *